VARIABLE AREA MAGNETIC RECORDING APPARATUS

Original Filed Jan. 16, 1952

3 Sheets-Sheet 1

INVENTORS
RALPH B. ATKINSON
STEVEN G. ELLIS
BY Zulinder Mattingly & Huntley
Attorneys

VARIABLE AREA MAGNETIC RECORDING APPARATUS

Original Filed Jan. 16, 1952

INVENTORS
RALPH B. ATKINSON
STEVEN G. ELLIS
BY Zulwider Mattingly & Huntley
Attorneys Sept. 23, 1958 R. B. ATKINSON ET AL 2,853,560

VARIABLE AREA MAGNETIC RECORDING APPARATUS

Original Filed Jan. 16, 1952 3 Sheets-Sheet 3

INVENTORS
RALPH B. ATKINSON
STEVEN G. ELLIS
BY Lulwider Mattingly & Huntley
Attorneys United States Patent Office 2,853,560

Patented Sept. 23, 1958

2,853,560

VARIABLE AREA MAGNETIC RECORDING APPARATUS

Ralph B. Atkinson, Los Angeles, and Steven G. Ellis, Van Nuys, Calif.; said Ellis assignor to said Atkinson Original application December 15, 1951, Serial No. 261,892, now Patent No. 2,806,904, dated September 17, 1957. Divided and this application June 29, 1954, Serial No. 440,174

8 Claims. (Cl. 179—100.2)

This invention relates generally to the magnetic recording of intelligence, and has particular reference to a magnetic recording apparatus for producing a variable area magnetic recording of signals corresponding to such intelligence.

This application is a division of our copending application Serial No. 261,892, filed December 15, 1951, for Variable Area Magnetic Recording Apparatus.

Magnetic recording on a specially designed magnetic tape or wire has long been known and used, and many advantages of such recording have widened the field of use considerably. More recently, the utility of the magnetic recording processes has been greatly increased by the development of certain methods for making visible magnetic recordings as distinguished from the earlier types of recordings wherein the recorded material was completely invisible.

It is possible to render the magnetic recording visible by flowing finely divided magnetic particles over the magnetic recording so that the particles are held to the record material in varying amounts depending upon the intensity of magnetization of the particular area of the material. A method and apparatus for magnetic reproduction of pictures using this general method of flowing magnetic particles over a magnetized record is the subject of a copending application Serial No. 221,044, filed April 14, 1951, by Ralph B. Atkinson and Steven G. Ellis. As is disclosed in that application, the visible record formed upon the magnetized record material may be transferred to another support to produce a permanent print or copy of the magnetic record. The process of making visible records from magnetic records has been termed "ferrography," and the process has come to be known as the ferrographic process as distinguished from the photographic process wherein light-sensitive materials are employed.

In a copending application Serial No. 250,364 filed October 8, 1951, by Ralph B. Atkinson and Steven G. Ellis, it is pointed out that prior to the invention therein-disclosed of an apparatus for making a variable area magnetic recording, ferrography had seldom been used in the recording of technical data because the resulting visible record revealed only areas of different densities, because prior thereto the magnetic recording apparatus in use was capable only of producing a variable density record. Since it is difficult to evaluate differences in intensity, either by observation or physical measurement, the use of the ferrographic process for the recording of technical data was limited almost entirely to those applications where it was desired only to obtain qualitative results.

The aforementioned copending application Serial No. 250,364 discloses an apparatus for producing a variable area recording wherein the height of the record at any given point corresponds to the intensity of the recorded signal. By making such a record visible by the ferrographic process, it is possible to obtain a record comprising an oscillogram of the applied signal. Such a record combines the advantages of a record made by a direct-reading, pen-type oscillograph with the speed of response corresponding to that of the cathode ray oscilloscope. In addition, the disadvantages of the photographic method of recording encountered in both the mirror-type oscillograph and cathode ray oscilloscope are avoided.

In the apparatus disclosed in the aforementioned copending application Serial No. 250,364 a variable area recording is obtained by passing the recording medium beneath a recording head which provides a recording gap of substantial length extending transversely of the direction of travel of the recording medium. In one form disclosed in that application, the recording gap is made V-shaped—that is, wider at one end than at the other, thus causing a concentration of the flux at the narrow end of the gap. Thus, at low signal intensities a permanently magnetized record is produced only in that portion of the recording medium passing the narrow end of the gap, whereas at higher signal levels, the flux density is increased across the wider portions of the gap so as to record a correspondingly wider line on the moving recording medium.

While the apparatus disclosed in said aforementioned copending application Serial No. 250,364 is entirely practical, the apparatus nevertheless embodies certain disadvantages residing principally in the difficulty of forming a V-shaped gap of the required accuracy. It will be appreciated that the gaps used in magnetic recording are extremely small, and a V-shaped gap for producing a variable area magnetic recording may have a minimum width of one-half mil (the term "mil" being used to represent a distance of one one-thousandth of an inch), and a maximum width of perhaps one and one-half mils. Furthermore, in order to achieve a desired recording characteristic, it may be necessary to make the sides of the gap curved as distinguished from the straight sides of a truly V-shaped gap. The use of a curved support for a variable clearance between the recording head and the recording medium disclosed as alternative modifications in said copending application Serial No. 250,364 does not completely obviate the disadvantages and difficulties of construction of the V-shaped gap because they introduce the difficulty of feeding the recording medium over a curved support and also tend to produce loss of definition due to fringing resulting from the spacing of the recording head from the recording medium.

To overcome the above-mentioned disadvantages, this invention provides a variable area recording apparatus utilizing a recording gap of substantial length and uniform width, and eliminates the need for any curved supports for the recording medium or the necessity of spacing the recording head from the record material. Instead, the present invention provides a recording apparatus which is maintained in constant contact with the recording medium throughout the entire length of the elongated recording gap, and provides also for the selection of substantially any desired relationship between the location along the length of the gap and the magnetomotive force across the gap at that location.

It is therefore an object of this invention to provide a magnetic recording apparatus for producing variable area recordings which utilizes a recording gap of substantial length and uniform width which is maintained in contact with the recording medium throughout the length of the recording gap.

It is also an object of this invention to provide an apparatus of the character set forth in the preceding paragraph which includes an electromagnet for producing an integrated magnetomotive force across the recording gap as a whole, corresponding to a signal to be recorded, together with means for producing a concentration of magnetic flux across the gap at one end thereof.

It is another object of this invention to provide an apparatus of the character set forth in the preceding paragraph which includes a magneitc circuit external to said electromagnet in which said circuit includes said recording gap and consists of a plurality of parallel branch circuits crossing said gap at different locations, the reluctance of said branch circuits being a function of the location at which said gap is crossed thereby.

It is an additional object of this invention to provide an apparatus of the character set forth hereinbefore in which means is provided for producing across the recording gap a gap magnetomotive force bearing a ratio to the integrated magnetomotive force which is a function of the location along the length of the gap.

It is also an object of this invention to provide a magnetic recording apparatus for producing variable area recordings which includes an electromagnet for production an integrated magnetomotive force across the recording gap as a whole, corresponding to a signal to be recorded, and which includes a pole structure comprising a pair of adjacent pole members separated by a recording gap of substantial length and uniform width, together with a magnetic circuit means connecting opposite poles of said electromagnet to the ends of corresponding pole members, said pole members having a reluctance from end to end comparable to the reluctance of said recording gap.

It is another object of this invention to provide an apparatus of the character set forth in the preceding paragraph in which the reluctance per unit length of said pole members varies along the length thereof.

It is a still further object of this invention to provide an apparatus of the character set forth in the preceding paragraphs in which the area per unit length of said recording gap varies along the length thereof.

Other objects and advantages of this invention will be apparent from a consideration of the following specification, read in connection with the accompanying drawings, wherein.

Figure 8:
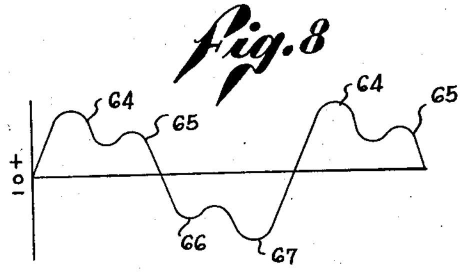
Figure 8 is a graph illustrating the wave form of the signal represented by the recording illustrated in Figure 7.
Figure 14:
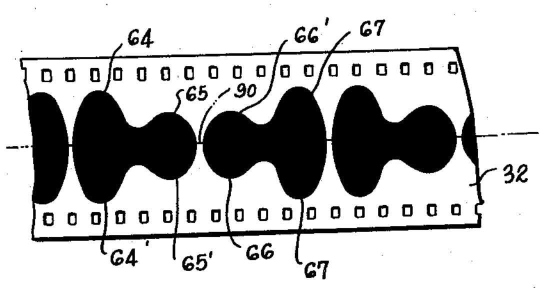
Figure 15:
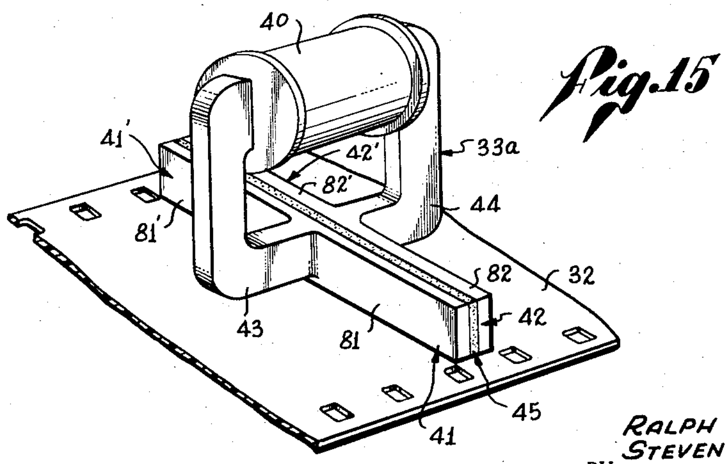

Figure 14 is a diagrammatic representation of the form of record produced by an apparatus of the type shown in Figure 15 when there is applied thereto a signal of the character represented by Figure 8; and Figure 15 is a perspective view of a still further modification of the invention, designed to produce a somewhat different type of recording from that produced by the devices illustrated in the preceding figures.

Figures 1, 2, 3:
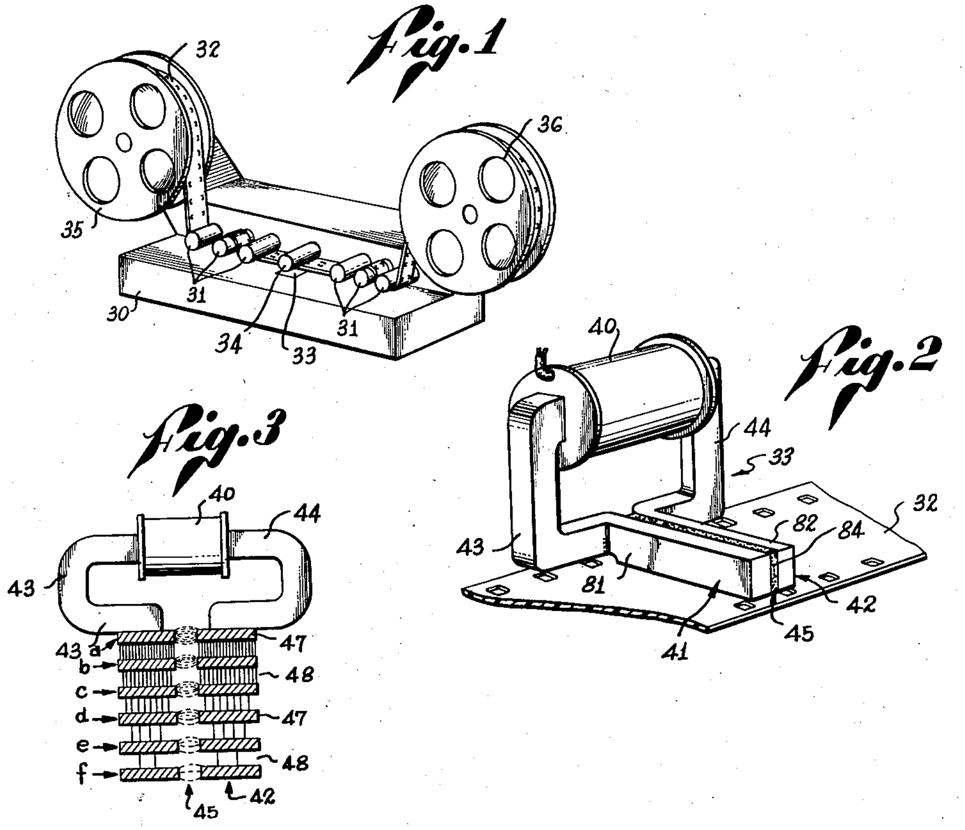
Figure 1 is a perspective view illustrating one form which a variable area recording apparatus constructed in in accordance with this invention may take.
Figure 2 is a perspective view illustrating the construction of a variable area recording head embodying the principles of this invention.
Figure 3 is a diagrammatic view representing the magnetic circuits employed in the structure shown in Figure 2.

Essentially, this invention contemplates the use of a magnetic tape transport means, a magnetic recording head of special construction against which the tape bears and across which it passes while being transported, together with associated electrical apparatus for supplying an appropriate signal to the recording head. Such an apparatus is illustrated in Figure 1 as comprising a cabinet or housing 30 which encloses a suitable electric motor (not shown) or other source of motive power for driving film sprockets or rollers 31 for moving a transportable magnetic tape 32 past a recording head 33. As the tape 32 is moved past the recording head 33, it is maintained in constant and intimate contact therewith by a roller 34 or pressure pad of usual and conventional construction.

To facilitate transporting the tape 32 in the manner described, the same is preferably perforated in the general manner of motion picture films. While unperforated tape may be used, and while the tape 32 may be of substantially any desired width, a preference is expressed for a tape having the width and sprocket hole arrangement of conventional 35 mm. film because of the ready availability of suitable sprockets, reels, and the like.

The drive means for rotating the sprockets 31 is arranged preferably to transport the tape at a constant linear speed past the recording head 34 so as to permit ready and accurate measurements with respect to time. When so transported, the tape 32 is fed from a suitably supported supply reel 35, and after recording is wound upon a suitable take-up reel 36.

The recording head 33, which is of special construction, may be constructed in accordance with the principles illustrated in Figure 2 to include an electromagnet 40, a pair of pole members 41 and 42 and magnetic circuit means 43 and 44 for connecting opposite poles of the electromagnet 40 to adjacently disposed ends of the pole members 41 and 42, respectively.

At the outset, it should be recognized that the drawings accompanying this application are largely diagrammatic, the arrangement of parts and details of construction shown having been selected with a view to best illustrating the principles of the invention. Different arrangements and details of construction which will be obvious to those skilled in the art may be employed to embody the principles of this invention in more compact structures designed also to facilitate the manufacture thereof. Furthermore, it should be recognized that the drawings are not to scale, and are mal-proportioned for the purpose of clearly illustrating the essential features of construction, gaps and certain structural parts having widths and thicknesses of the order of magnitude of one mil being represented in the drawings as being of substantial width and thickness for the purpose of clearly illustrating the construction.

The electromagnet 40 may be of substantially conventional construction, wound to provide a number of turns sufficient to produce a substantial magnetomotive force and to provide an impedance appropriate to the source of signal to be recorded. The magnet circuit members 43 and 44 may also be constructed along conventional lines, preferably being laminated to minimize hysteresis and eddy current losses, and are preferably made of a high-permeability, low-loss material. The members 43 and 44 are proportioned to provide a reluctance which is low compared to the reluctance of the pole structures 41, 42 and low compared to the reluctance of the recording gap. The magnetic circuit members 43 and 44 are connected as shown to one end of each of the pole structures 41 and 42 so as to provide between said ends a magnetomotive force which is substantially equal to that appearing at the poles of the electromagnet 40.

The pole structures 41 and 42 are secured in side-by-side relation to each other to define therebetween a recording gap 45. The recording gap 45 is made of uniform width, preferably of the order of magnitude of one mil, and is made with a length (equal to the length of the pole structures 41, 42) appropriate to the width of the recording medium 32. When used with 35 mm. film, the recording gap may have a length of about one inch.

A recording gap 45 of uniform width throughout the length thereof is most easily obtained by the use of a metallic spacer member 84 having a thickness equal to the desired gap width and formed of a suitable non-magnetic material such as brass or beryllium copper. Such sheet material is readily available in a form sometimes known as "shim" stock in a wide range of thicknesses ranging upwards from one-half mil. Such material is eminently suited to use as the spacer member 84 because of its ready availability and, what is more important, because of the great uniformity of its thickness and the accuracy with which the actual thickness of the material corresponds to its nominal thickness dimension.

The pole structures 41 and 42 comprise pole members 81 and 82 which are so constructed as to have an appreciable reluctance. This may be accomplished by suitably proportioning the cross-sectional area of the members, and by a suitable selection of the material from which the members are made, such selection being made with reference to the magnetic properties of the material.

The manner in which the apparatus illustrated in Figure 2 operates to provide a variable area magnetic recording may perhaps be best understood by having reference to Figure 3 which illustrates diagrammatically a magnetic circuit approximately equivalent to that of the apparatus shown in Figure 2. In Figure 3 each of the pole members 41, 42 is illustrated as consisting of a plurality of low reluctance magnetic elements 47 and associated gaps 48 separating each member 47 from the next adjacent such member. The reference letters *a—f* of Figure 3 are used herein as suffixes to denote the relative locations of the various parts of the magnetic circuit. Thus, 47*c* represents the magnetic member 47 at location c, and similarly 45*b* represents the recording gap between oppositely positioned magnetic members 47 at location *b*. It will be seen that the pole structures 41 and 42 of Figure 3 approximate the magnetic properties of the actual pole structures shown in Figure 2, the total reluctance of the gaps 48 being equal to the total reluctance from end to end of the actual pole structures. The closeness of the approximation depends on the number of discrete elements assumed, approaching full equivalency, the approximation is sufficiently close to permit an accurate explanation of the mode of operation.

Because of the low reluctance of the magnetic circuit members 43 and 44, the full magnetomotive force generated by the coil 40 may be considered as applied between the first two magnetic members 47*a*. It will be seen by an inspection of Figure 3 that this full magnetomotive force exists across the first portion 45*a* of the recording gap. It will be equally apparent that the flux density across the recording gap section 45*b* will be less than that across the gap section 45*a*, because in addition to overcoming the reluctance of the recording gap 45*b*, such flux must also overcome the reluctance of the two gaps 48*a* in the pole members 41 and 42, respectively. Similarly, it will be seen that the flux density across a more remote recording gap section such as the section 45*d*, for example, will be still further reduced, since the flux passing across that portion of the recording gap must overcome not only the reluctance of the gap section 45*d*, but also the reluctance of the gaps 48*a*, 48*b*, 48*c* of the pole member 41, and of the gaps 48*c*, 48*b*, and 48*a* of the pole member 42.

Figure 4:
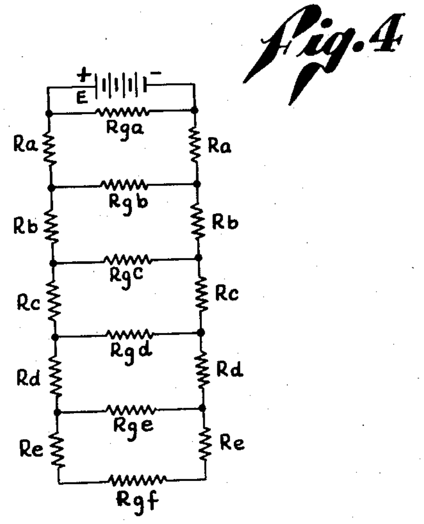
Figure 4 is a schematic diagram representing an electrical analogy to the magnetic circuit arrangement of Figure 3.

An analogous electrical circuit is illustrated in Figure 4, in which the source of magnetomotive force is replaced by the battery E providing an electromotive force. The electrical conductors are analogous to the portions of the recording head which are made of low reluctance magnetic material, and the resistances R*a*—R*e* correspond to the air gaps 48*a*—48*e*. The cross connections R*ga*—R*gf* correspond to the reluctances of the air gaps 45*a*—45*f*. In Figure 4 it will be seen that the full electromotive force E is applied across the first resistance R*ga*. A somewhat smaller voltage is applied across the second resistance R*gb* due to the voltage drops in the two resistances R*a* produced by the current passing through the cross-connected resistances R*gb*—R*gf*. In like manner the voltage across the resistance R*gc* is less than that across the resistance R*gb* due to the voltage drops through the resistances R*b* produced by the sum of the currents drawn by the cross connected resistances R*gc*—R*gf*.

Figure 5:
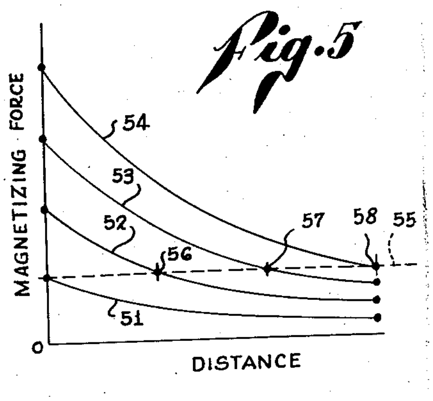
Figure 5 is a graph representing the manner in which the flux density across the recording gap at a given location varies as a function of that location along the length of the recording gap.

In Figure 5 there is plotted a family of four curves 51, 52, 53, and 54 representing the flux density, or alternatively the magnetomotive force, existing across the recording gap 45 as measured at different positions along the length of the gap, the origin of the curve being taken at the innermost end of the pole members 41 and 42—that is, at the ends thereof which are connected directly to the magnetic circuit members 43 and 44. The four curves 51—54 represent the flux densities produced by four different intensities of magnetization produced by the coil 40. The horizontal dotted line 55 represents a threshold level of gap magnetomotive force below which no permanent magnetization of the recording medium will be produced. Curve 51 therefore represents the minimum signal level which, when applied to the coil 40, will produce any permanent magnetic record, and by observing that the intersection of the curve 51 with the line 55 occurs at the origin, it will be seen that this represents the limiting condition producing a permanent record only at the extreme edge of the tape. Curve 52 represents a higher level, and it will be observed that the curve crosses the line 55 at the point marked 56. Thus in the region to the left of the point 56 the magnetomotive force across the gap will be sufficient to produce a permanent magnetic record, whereas in the region to the right of the point 56 the magnetizing intensity will be insufficient. Thus a signal of a magnitude such as is represented by the curve 52 will cause a permanent recording to be made for a distance transversely of the tape approximating one-third the length of the gap.

The curves 53 and 54 respectively intersect the threshold level line 55 at the points marked 57 and 58, representing, respectively, the intensities of magnetization required to produce permanent magnetic recordings extending, respectively, for two-thirds the length of the gap and for the full length of the recording gap.

Figure 6:
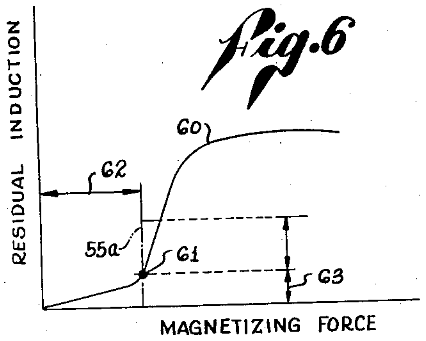
Figure 6 is a graph representing the magnetic characteristics of typical magnetic recording media.

Whether or not a given magnetizing force will produce a permanent magnetic record and the intensity of magnetization of that record depends, of course, upon the magnetic characteristics of the recording medium. There is illustrated in Figure 6 a characteristic curve which is representative of the magnetic characteristics of magnetic recording media generally. In Figure 6 there is shown a curve 60 which represents the relation between the magnetizing force applied to a magnetic recording medium and the resulting residual induction or permanent magnetization after the magnetizing force is removed. Assuming a neutral recording medium, the curve starts at the origin representing zero residual induction when no magnetizing force is applied. The curve rises slowly to a point marked 61, the abscissa of which is represented by the dimension line bearing the reference character 62, and the ordinate of which is represented by the dimension line bearing the reference character 63. The dimension 63 represents the threshold residual induction and constitutes that degree of permanent magnetization which will produce a definite though low intensity of permanent magnetism in the magnetic recording medium. The dimension line 62 represents the amount of magnetizing force which must be applied to produce such a threshold condition.

From the point 61 the curve rises steeply to a high value of residual induction, and then curves to the right with a decreasing slope, finally becoming parallel to the horizontal axis representing the maximum possible residual induction which can be produced regardless of the magnitude of the magnetizing force.

The curve 60 is similar to the H and D curve used to represent the properties of photographic materials, the dimension 62 corresponding to the inertia of photographic materials, and the slope of the steeply rising portion corresponding to the gamma of the photosensitive material.

Ideally, the magnetic recording medium selected for use with a variable area magnetic recording head of the type herein described has a small inertia—that is, a short dimension line 62, so that the amount of magnetizing force necessary to produce a permanent record need not be too great. The steeply sloping part of the curve 60 should have as steep a slope as possible so that once the magnetizing force exceeds the threshold value, the residual induction will rise rapidly with small increases in magnetizing force so as to produce a record which in appearance, after being coated with the visible magnetic particles, displays a clean, well-defined line of demarcation between those portions which have been permanently magnetized and those which have not.

In Figure 6 the dashed line 55*a* passing vertically through the point 61 represents the threshold value of magnetizing force which is represented in Figure 5 by the dashed line 55.

Thus it is seen from a comparison of Figures 5 and 6 that as the energy supplied to the magnetizing coil 40 is increased, no permanent magnetic record is produced until the magnetizing force reaches the mentioned threshold value for the portion of the recording gap 45 nearest the magnetic circuit members 43 and 44, such level of magnetizing force being represented by the curve 51 of Figure 5. Thereafter, as the energy supplied to the coil 40 is increased, the length of that portion of the recording gap 45 across which the magnetizing force is greater than the threshold value correspondingly increases until, at the maximum signal condition, the magnetomotive force across the gap 45 is at all points along the length thereof higher than the threshold value.

Figure 7:
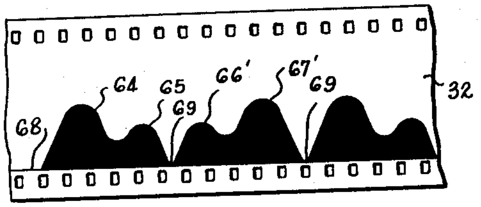
Figure 7 is a diagrammatic representation of the type of record produced by a recording head of the character illustrated in Figure 2.

Figure 7 illustrates the type of record produced by the described operation of the magnetic recording head shown in Figure 2 when there is applied to the electromagnet 40 thereof a signal of the character illustrated graphically in Figure 8.

The signal represented by Figure 8 constitutes an alternating electrical potential of a given fundamental frequency and carrying a substantial second harmonic component resulting in the production of two distinct positive peak signals 64 and 65 followed by two corresponding negative peak signals 66 and 67. Thereafter the cycle repeats itself at the fundamental frequency. The magnetic record which is produced is of the character illustrated in Figure 7 consisting of the positive peaks 64 and 65 followed by what may be termed a rectified representation of the negative half of the cycle resulting in the peaks 66′ and 67′. The apparent polarity reversal results from the fact that the magnetic material which is flowed across the magnetized recording medium adheres equally well to both polarities of magnetization, and does not distinguish between those elemental areas having a north polarity and those having a south polarity. Once this fact is recognized, the wave form of the original signal is quite clearly seen by inspection of the record produced. The important consideration is that the length of the visible recording, measured upwardly in Figure 7 from a base line 68 (corresponding to that end of the gap 45 situated nearest the magnetic circuit members 43 and 44) corresponds to the instantaneous amplitudes of the signal applied to the electromagnet.

The record produced is represented in Figure 7 as being characterized by narrow blank spaces 69 corresponding to the points at which the signal level is below the aforementioned threshold value. This is consistent with the initial assumptions made thus far in describing the operation of the apparatus in which a neutral magnetic recording medium is assumed, and in which the signal is applied directly to the electromagnet 40 without the use of any bias currents or modulated carrier signals. These blank spaces are readily eliminated through the application of any of a number of well-known magnetic recording techniques such as the use of a premagnetized recording medium, the use of either direct or high-frequency bias currents, or by the use of a carrier signal of high frequency upon which the signal to be recorded is applied as an amplitude modulation.

Preferably, the recording head is so constructed as to produce a linear relationship between the amplitude of the applied signal and the length of the recording gap which develops a magnetizing force in excess of the threshold value. If such a linear relationship is established, then the visible record produced represents truly the wave form or amplitude variations of the applied signal.

As will be apparent to those skilled in the art, this does not necessarily require a linear relation between the magnetizing force and the distance along the gap at which that magnetizing force is measured. In fact, as may be seen from an inspection of Figure 6, the characteristic is most probably curved so as to be concave upwards, but the degree of curvature and the shape of the curve will depend upon many factors, not the least important of which are the characteristics of the recording medium used.

An upwardly concave characteristic is inherent in the structure shown in Figure 2. By resort to the analogous electrical case represented by Figure 4, it can be shown that if the reluctance of each of the gaps 48 is made equal to each other and equal also to the reluctance of the recording gap 45, a curve form which is concave upwards, and which is very sharply curved near the beginning, results. If the effects of stray fields, fringing, and saturation are ignored, the flux distribution across the gap will be such that the flux across each gap section 45*a*, 45*b*, etc. will be approximately one-fourth that across the next preceding section. A curve having such a great curvature would quite likely fail to produce the desired linear relationship between the amplitude of the input signal and the length of the recorded line. However, in practice it is found that the saturation and fringing effects cannot be ignored, and that these effects tend to flatten the curve considerably. It can be seen, for example, that as the magnetizing force across the gap 45*a* increases with a corresponding increase in flux density, those portions of the magnetic elements 47 immediately adjacent the gap 45 will become saturated, with a corresponding decrease in permeability and a corresponding increase in reluctance, whereas those portions spaced from the gap will not be so saturated. This tends to divert the flux farther along the pole piece, and so causes the flux across each of the gap sections 45*a*, 45*b*, etc. to be a larger fraction of the flux density across the next preceding gap section than the simplified calculations would indicate.

Figure 9:
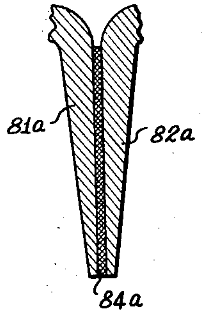
Figure 9 is a fragmentary sectional view of a modified structure similar to Figure 2, Figure 9 representing the construction of the modified apparatus when viewed in a horizontal section such as might be taken through the horizontal pole members of Figure 2.

Adjustment of the shape of the characteristic curve may be made by varying the cross-sectional area of the members 81 and 82, for example as by tapering the members in thickness as is indicated by the members 81*a* and 82*a* of Figure 9. Such a tapering of the members provides a reduced reluctance at the inner end of the structure, and an increased reluctance at the outer end, thus tending to shift outwardly the threshold value of magnetomotive force produced across the recording gap by a given magnetomotive force generated by the electromagnet 40.

Figure 10:
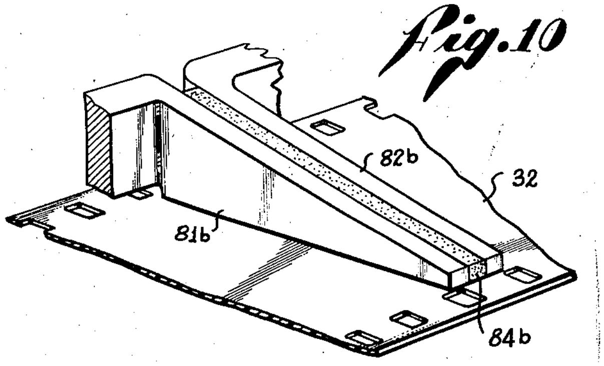
Figure 10 is a fragmentary perspective view of an apparatus similar to that shown in Figure 2, but illustrating a further modified form of construction.

Somewhat similar results may be achieved by tapering the pole members in height as is represented by the pole members 81*b* and 82*b* of Figure 10.

Figure 11:
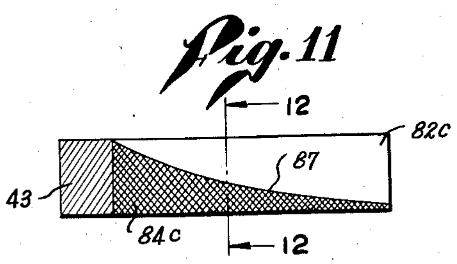
Figure 11 is a longitudinal sectional view of a still further modified device, the section of Figure 11 being a vertical section such as might be taken through the spacer member between the horizontal pole members of Figure 2.
Figure 12:
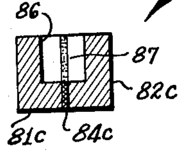
Figure 12 is a cross-sectional view of the device shown in Figure 11, Figure 12 being taken substantially along the line 12—12 of Figure 11.

Figures 11 and 12 illustrate still another way in which a characteristic curve of desired form may be achieved. In the modification shown in Figures 11 and 12 a pole structure comprising the pole members 81*c* and 82*c* separated by the spacer member 84*c* are first produced which are similar in all respects to that shown in Figure 2. Thereafter, the upper surface of the members 81 and 82 is milled away to provide a slot or groove 86 extending downwardly from the upper surface of the members 81*c* and 82*c*, the depth of the slot 86 being varied along the length of the members to provide a curved surface 87 such as is shown in Figure 11 defining the bottom of the slot.

Assuming that the recording gap 45 is one mil wide and that the members 81*c* and 82*c* have a horizontal thickness of about 20 mils, it is seen that the width of the gap may be increased by the slot 86 by a factor of from five to ten times without a material reduction in the cross-sectional area of the pole members 81*c* and 82*c*. This expedient serves to concentrate the flux across the gap 45 at the lower surface of the pole structure, particularly near the outer end thereof. This tends to flatten out the characteristic curve of the recording head, since only that portion of the flux which crosses the gap near the undersurface of the structure is effective in magnetizing the recording medium.

Figure 13:
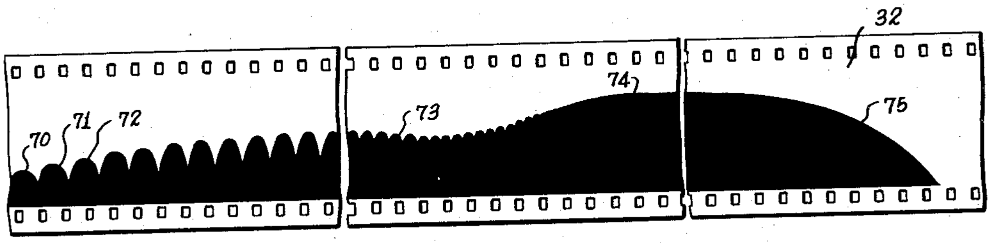
Figure 13 is a diagrammatic view illustrating the appearance of a typical oscillogram produced through the use of the apparatus of this invention, Figure 13 illustrating the frequency response characteristic of an amplifier.

Figure 13 represents a typical test record produced by the operation of the apparatus thus far described. Figure 13 comprises a visible record of the frequency response characteristic of an amplifier. Such a record may be produced by moving the recording medium 32 past the recording head 33 at a constant speed while there is applied to the input of the amplifier under test a signal of constant amplitude whose frequency is caused to vary with time from a very low frequency to a very high frequency. The output of the amplifier is connected to the electromagnet 40 of the recording head, and the voltage applied to the electromagnet will vary as the amplification of the amplifier varies as a function of the applied frequency.

The magnetic record thus produced reveals, when treated with the visible magnetic material as hereinbefore described, a curve of the character shown in Figure 13 and representing diagrammatically the frequency response characteristic of the amplifier. As is shown in Figure 13, the low frequency signals represented by the half-cycle peaks 70, 71, 72 etc. is indicated as having been somewhat attenuated by the amplifier under test. A relatively flat region 73 is shown at frequencies of an intermediate range with a maximum gain being revealed at the upper end 74 of the middle frequency range. A rather sharp cut-off 75 at the high frequency end of the spectrum is revealed.

Figure 14 represents diagrammatically the type of visible record produced by a modified recording head 33*a* represented in Figure 15. The recording head 33*a* is identical to that illustrated in Figure 2, except for providing a second pole structure 41′, 42′ identical to the pole structures 41, 42 but extending outwardly to the rear from the magnetic circuit members 43, 44. The pole structures are, of course, made somewhat shorter than in the form shown in Figure 2 if the device is to be used with a recording medium 32 of the same width.

It will be appreciated that with the structure shown in Figure 15, when the energy applied to the electromagnet 40 is increased the first recording is made at the center of the recording medium where the two pole structures 41, 42 and 41′ and 42′ are joined to each other and to the magnetic circuit members 43, 44. This point defines a neutral axis which is represented in Figure 14 by the broken line 90. As the signal level is increased, the length of the line permanently magnetized increases outwardly in both directions from the neutral axis 90.

Thus, when a signal of the character represented in Figure 8 is applied to the recording head shown in Figure 15, there results a record of the type shown in Figure 14 wherein the positive peaks 64 and 65 are reproduced and are accompanied by mirror images 64′ and 65′ thereof. Similarly, the negative peaks 66 and 67 are recorded as well as the positive mirror images 66′ and 67′.

The devices herein described employ pole structures comprising a pair of pole members wherein each pole member comprises a single homogeneous member of suitably high reluctance per unit length. Such a suitably high reluctance may be obtained through appropriate selection of material. Such a member may, for example, be formed of a suitable synthetic resin heavily impregnated with powdered magnetic material such as iron dust. Somewhat similar structures can be made from powdered magnetic materials which are bonded to each other by a suitable adhesive or by means of a sintering or semi-sintering process.

In using any of the recording heads hereinbefore described, the pole members are preferably held lightly in contact with the surface of the recording medium, and disposed with the length of the pole members extending transversely of the direction of movement of the recording medium. Also, to prevent local demagnetization and to concentrate the effective magnetizing force in the region of the recording gap, the pole structures illustrated in each of Figures 2, 9, 10, 11, 12, and 15 are preferably formed with a partially cylindrical or downwardly convex surface, or, alternatively, the recording medium is drawn over an oppositely curved surface, so as to limit the area of contact of the pole members with the recording medium to a narrow band in the immediate vicinity of the recording gap.

From the foregoing, it will be observed that this invention provides an apparatus for producing a variable area magnetic recording, and that the apparatus includes a variable area magnetic recording head characterized by the employment of a recording gap of uniform width and substantial length as distinguished from the disclosures contained in the aforementioned copending application Serial No. 250,364 wherein the gap is given a V-shape, or wherein the recording pole pieces are spaced variously from the surface of the recording medium. The invention described herein avoids certain of the disadvantages inherent in the apparatus disclosed in that copending application, and provides various types of structures which are susceptible to ready and accurate manufacture. Furthermore, as will have been observed, the construction is such as to permit the shape of the recording characteristic curve to be selected substantially at will. This is accomplished by appropriately selecting the reluctances of the various parts of the magnetic circuit, and does not require any changes in the configuration or dimensions of the recording gap.

While an attempt has been made herein to disclose and explain the underlying principles of the invention, no attempt has been made to give precise directions for the determination of the dimensions of the various parts of the magnetic apparatus for the reason that experience has indicated that these dimensions and characteristics are more quickly determined by trial and error than by calculation since it is not possible in calculations of this type to take into account all of the factors which determine the ultimate results. It is believed, however, that the principles of the invention have been outlined with sufficient clarity to permit one skilled in the art to make, without difficulty, a variable area magnetic recording head of the type herein described, and to permit such a head to be used for the making of variable area recordings.

It will be observed that this invention provides variable area magnetic recording heads for making various types of records, such as are illustrated for example in Figures 7, 13, and 14. In this connection it is to be noted that a double-ended head such as is shown in Figure 15 for producing records of the character represented by Figure 14 may utilize pole members 81, 82 and 81', 82' of any of the types and incorporate, as desired, any of the features of construction previously described with reference to Figures 2 to 12, inclusive.

Attention is directed particularly to the fact that by the use of the apparatus herein disclosed, it is possible to make visible records constituting oscillograms of the signal applied to the recording head, and that these oscillograms may be rendered immediately visible for study without the delay and difficult processing attendant upon the use of photographic recording methods.

While the various preferred embodiments of this invention have been illustrated and described herein, the invention is not to be limited to the details illustrated and described, except as defined in the appended claims.

We claim:

1. In a variable area magnetic recording head for producing on a longitudinally moving elongated magnetizable recording medium a permanent magnetic record of an electrical signal in which the height of said record transversely of said medium varies in correspondence with variations of the instantaneous amplitude of said signal, the combination of: an electromagnet for producing a magnetomotive force corresponding to said signals; a pair of magnetic conductors of low reluctance extending from the ends of said electromagnet to points adjacent said medium and substantially aligned in a direction parallel to said longitudinal movement of said medium; and a pair of magnetic pole structures of relatively high reluctance and of a length substantially equal to the maximum width of the magnetic record disposed in closely spaced side-by-side relation to define therebetween a narrow recording gap of uniform width, one surface of each of said pole structures adjacent said gap being in contact with said recording medium, said pole structures and the length of said gap therebetween extending transversely of said recording medium, the ends of said magnetic conductors being connected to said pole structures at points spaced from one end of said structures, whereby said recording medium is magnetized along said length of said gap to a varying degree dependent upon the amplitude of said signal and the distance from the connection of said magnetic conductors to said pole structures.

2. A variable area magnetic recording head according to claim 1 wherein the reluctance per unit length of each of said magnetic pole members is uniform from end to end thereof.

3. A variable area magnetic recording head according to claim 1 in which said magnetic pole members are identical and of uniform cross-sectional area from one end to the other thereof.

4. A variable area magnetic recording head according to claim 1 which includes a second pair of magnetic pole members identical to said first-mentioned pair of magnetic pole members and disposed in axial alignment therewith, and connected in like manner to said pair of magnetic conductors, said two pairs of magnetic pole members extending outwardly in opposite directions from said pair of magnetic conductors.

5. A variable area magnetic recording head according to claim 1 wherein said adjacently disposed magnetic pole members are provided with a groove extending downwardly from the upper surface thereof and extending longitudinally of said pole members in coplanar relationship to said recording gap, said groove having a width a number of times greater than the width of said recording gap and having a depth which varies progressively from one end of said pole members to the other end thereof.

6. A variable area magnetic recording head according to claim 1 in which at least one of said magnetic pole members is longitudinally tapered to provide a cross-sectional area which varies progressively from one end of said member to the other end thereof.

7. A variable area magnetic recording head according to claim 1 wherein at least one of said magnetic pole members is provided with a width dimension normal to the plane of said recording gap which varies progressively from one end of said pole member to the other end thereof.

8. A variable area magnetic recording head according to claim 1 wherein at least one of said magnetic pole members is provided with a height normal to said recording medium which varies progressively from one end of said pole member to the other end thereof.

References Cited in the file of this patent

UNITED STATES PATENTS

| | | |
|---|---|---|
| 2,546,850 | Chancenotte | Mar. 27, 1951 |
| 2,594,414 | Garreau | Apr. 29, 1952 |
| 2,632,061 | Begun | Mar. 17, 1953 |